United States Patent [19]
Elkin et al.

[11] Patent Number: 6,006,068
[45] Date of Patent: Dec. 21, 1999

[54] TWO-WAY PAGER WITH TRANSMIT THRESHOLD

[75] Inventors: Kenneth Charles Elkin, Lake Worth; Craig J. Christmas, West Palm Beach; Leonard Wayne Bennett, Plantation, all of Fla.

[73] Assignee: Motorola, Inc., Schaumburg, Ill.

[21] Appl. No.: 09/005,674

[22] Filed: Jan. 12, 1998

[51] Int. Cl.⁶ .................................................. H04B 7/00
[52] U.S. Cl. ....................... 455/31.3; 455/38.3; 455/574
[58] Field of Search .................................. 455/427, 428, 455/31.1, 31.2, 31.3, 38.1, 38.3, 573, 574, 229, 343; 340/825.46

[56] References Cited

U.S. PATENT DOCUMENTS 4,851,820  7/1989  Fernandez .
5,032,835  7/1991  DeLuca .
5,049,875  9/1991  DeLuca et al. .
5,289,178  2/1994  Schwendeman .

*Primary Examiner*—Thanh Cong Le
*Attorney, Agent, or Firm*—Keith A. Chanroo

[57] ABSTRACT

Application of power to a transmitter in a messaging device is preceded by measuring a quality of at least one base station down-link signal received by a receiver in the device, and producing a transmit threshold signal when the measured signal quality corresponds to a substantial likelihood of accurate detection by a base station of an up-link signal to be transmitted from the device. The device transmitter is powered on only if the transmit threshold signal is present over a given interval prior to a transmitter operation. Thus, a relatively low-power battery and small antenna can be used effectively by the device, and its overall size kept at a minimum.

12 Claims, 6 Drawing Sheets

TWO-WAY PAGER WITH TRANSMIT THRESHOLD

BACKGROUND OF THE INVENTION

1. Field of the Invention

The present invention relates generally to two-way messaging devices or pagers (hereafter "pagers"), and particularly to a pager whose transmitter is powered only when the pager is in range of a base station receiver.

2. Discussion of the Known Art

Known pager systems use at least one base station for communicating with a number of portable pagers. Pagers and other user equipment assigned to the system are generally referred to as subscriber units (SU's). Over a forward or "down-link" frequency channel, a base station transmits down-link signals containing information destined to individual SU's whose addresses are also encoded in the down-link signals. If so configured, a two-way pager can transmit an acknowledgment signal back to the base station (an "ack-back" signal) to confirm its detection of a down-link signal addressed to it. In addition, the pager may be capable of transmitting other "up-link" signals to a base station, for example, to provide information that allows the pager's location to be established.

It is contemplated that a wireless communication system capable of global coverage for all subscribers, will soon be available. The system, known as "IRIDIUM", is presently specified to include mobile telephony and one-way pager service world-wide using a number of communication satellites in low-earth orbit (LEO). A satellite-based pager service will overcome certain limitations of terrestrial based systems. At present, people traveling with pagers know that paging systems around the world are not usually compatible. The United States (900 MHZ FLEX), South Korea (322 MHZ FLEX), and France (VHF ERMES), all have different paging frequencies and protocols. While several paging service providers have achieved regional and even some international coverage, such services still exclude major portions of the world. The result is that paging subscribers have few options for roaming worldwide and, sometimes, even on a regional basis.

By contrast, a mobile satellite system may operate according to a uniform protocol worldwide. Because a system subscriber may want to receive pages at any time while traveling globally, it is important that the system be capable of determining the subscriber's approximate location on the earth, so that pages destined to the subscriber can be transmitted from a base station (satellite) closest to the subscriber. Thus, a "two-way" or acknowledgment type of pager unit is desirable for use in paging systems extending over large geographic areas, and particularly for use in a global paging system.

A pager may not always be within range of a base station to detect a message sent from the base station. For example, the pager may be inside a building that attenuates signals from the base station below a threshold value needed for accurate pager reception. So-called received signal strength (RSS) circuits have been provided for terrestrial-based paging systems, to alert users when their pagers are out of range from a base station transmitter and that messages transmitted from the base station may not have been detected by their pagers. See, for example, U.S. Pat. No. 5,032,835 (July 1991); U.S. Pat. No. 4,851,820 (July 1989); U.S. Pat. No. 5,049,875 (September 1991); and U.S. Pat. No. 5,289,178 (Feb 1994). All relevant portions of these patents are incorporated by reference herein. Again, with a two-way pager system, if an acknowledgment or location signal from a system pager is not detected by a base station receiver, the system can re-transmit a message periodically until the addressed pager's signal is detected.

Even if a two-way pager receives and accurately detects a message signal addressed to it, power limitations of the pager's transmitter could make it unlikely that a signal radiated from the pager will be detected at a base station. Since it is desirable to use small and readily available batteries, e.g., size "AA" or "AAA" to power a pager, its transmitter radio frequency (RF) power output usually does not exceed 1000 milliwatts. Pager signal field strength is also limited by the size of the pager antenna, which for ease of portability should not exceed the size of the pager itself.

Thus, while base station transmitters can produce strong signals at RF power levels of, e.g., 150 watts allowing pagers located over wide geographic areas to detect them, signals radiated from the pagers have a lesser chance of being detected at a system base station. And, each time a pager transmits a signal, substantial battery power is consumed whether or not the signal is detected adequately at a base station. It would therefore be desirable to avoid wasting pager battery power when it is unlikely that a signal to be radiated from a two-way pager would be detected by a base station. Such a restraint on two-way pager transmitter activation would allow for a lower pager transmitter RF power level, a smaller pager antenna, and a smaller and less expensive overall construction for the pager including its battery components.

Also, if the user is alerted whenever his or her pager's transmitter is unable to signal a base station, he or she can simply move to a more favorable location where the alert ceases. Such an alert feature would also allow the pager transmitter to require only the minimum amount of power to signal a system base station under favorable propagation conditions. That is, the pager transmitter is activated only under a "go" condition when there is a good likelihood that its signal will be detected by a base station, and the transmitter does not waste battery power in a "no go" situation when it is unlikely that the pager's signal will be received.

SUMMARY OF THE INVENTION

According to the invention, a messaging device includes a receiver constructed and arranged to receive down-link signals from a base station, and a transmitter constructed and arranged to radiate up-link signals to a base station. A transmit condition stage is configured to measure a relative quality of one or more down-link signals received by the receiver, and to produce a corresponding transmit threshold signal when the measured signal quality corresponds to a substantial likelihood of accurate detection at a base station of up-link signals to be transmitted from the device. A processor is configured to cause the transmitter to be powered on only if the transmit threshold signal is present over a given time interval prior to a transmitter operation.

According to another aspect of the invention, a method of enabling a messaging device transmitter to be powered, includes the steps of receiving with a device receiver down-link signals from a base station, providing a device transmitter to radiate up-link signals to a base station, measuring with a transmit condition stage a relative quality of one or more down-link signals received by the receiver and producing a corresponding transmit threshold signal when the measured signal quality corresponds to a substantial likelihood of accurate detection at a base station of up-link signals to be transmitted from the device, and causing the transmitter to be powered on only if the transmit threshold signal is present over a given time interval prior to a transmitter operation.

For a better understanding of the present invention, reference is made to the following description taken in conjunction with the accompanying drawing, and the scope of the invention will be pointed out in the appended claims.

DETAILED DESCRIPTION OF THE INVENTION

Figure 1:
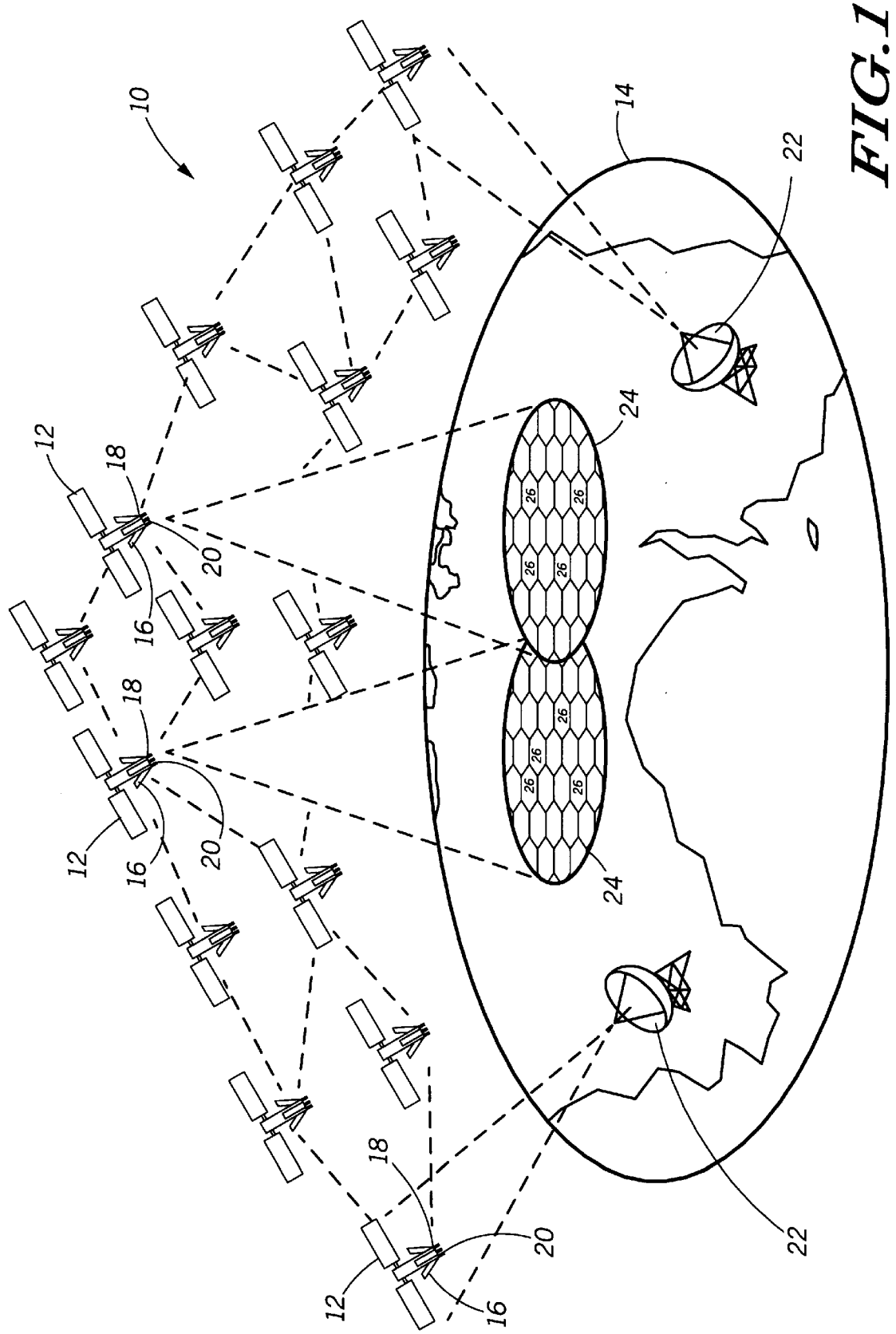
FIG. 1 is a pictorial representation of a satellite-based communication system in which the present invention can be applied.

FIG. 1 shows a satellite-based, global communication system 10 in which the present invention can be applied. For purposes of illustration and without limitation, system 10 is a LEO satellite-based communication system known as the mentioned IRIDIUM system. It will be appreciated that the present invention can also be applied in geo-stationary satellite communication systems, as well as in terrestrial paging systems.

In the illustrated embodiment, the system 10 comprises a moving constellation of a number, for example, 66 operational LEO satellites 12. The satellites 12 are placed in six distinct planes in near polar orbit at an altitude of about 780 kilometers, and they circle the Earth 14. Use of the LEO satellites 12 enables the system 10 to achieve certain link margins permitting effective communication with portable, hand-held SUs including telephones and pagers, using mission antennas 16 comparatively smaller than antennas required on geostationary satellites (not shown).

Each satellite 12 communicates with subscriber units via the mission antennas 16, and with other system satellites 12 using cross-link antennas 18. Gateway antennas 20 on each of the satellites enable them to link with gateway Earth stations 22. Each gateway Earth station 22 provides interconnection between public switched telephone networks (PSTNs) all over the Earth 14 and the system 10, by connecting calls or pages originating from local PSTNs to the system 10 and its portable subscriber units, and vice versa.

The mission antennas 16 associated with each satellite 12 communicate directly with ground SUs, by illuminating each one of a number of substantially non-overlapping regions 24 on the Earth's surface with 48 tightly focused antenna beams 26. The antenna beams 26 in each region 24 define contiguous coverage sectors of the region on the Earth's surface. The antenna beams produced by a single satellite 12 thus combine collectively to cover a generally circular area with a diameter of about 4,700 kilometers.

Figure 2:
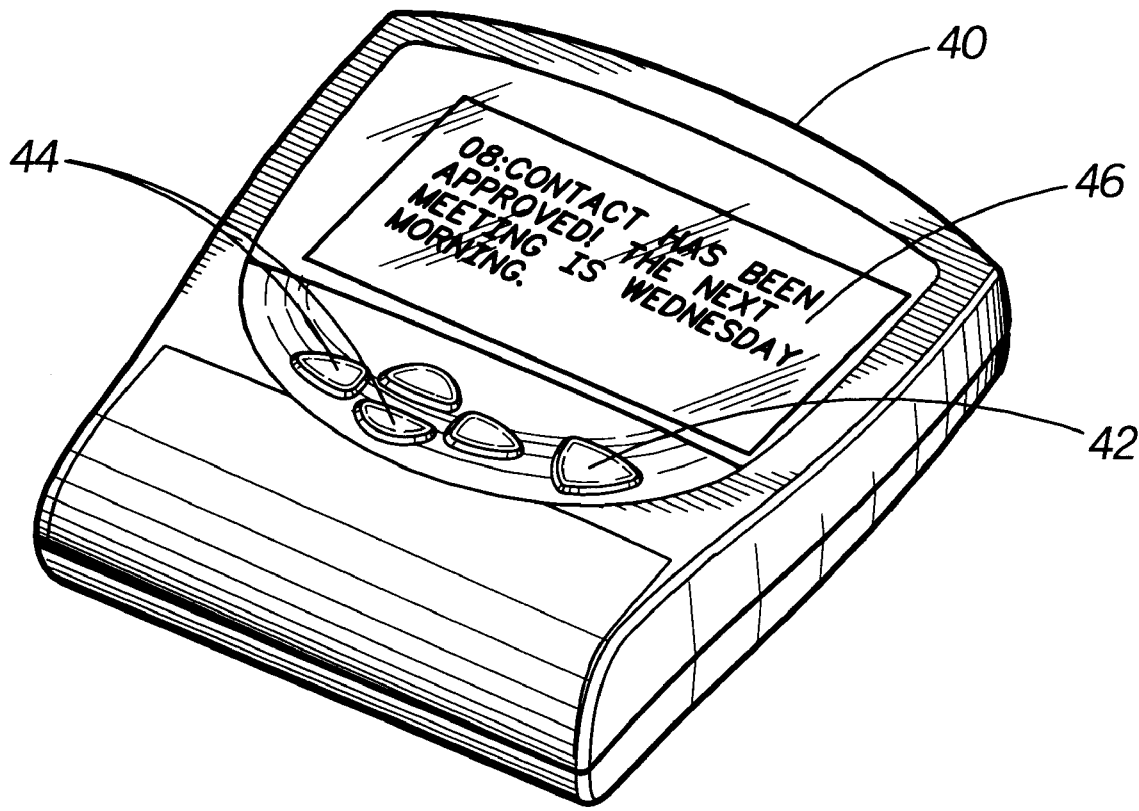
FIG. 2 shows a pager for use in the system of FIG. 1 and in which pager the present invention may be embodied.

FIG. 2 shows a pager or SU 40 for use in a messaging system such as the system 10 in FIG. 1, and in which pager the present invention can be embodied. The pager 40 has a menu select button 42, and a number of user-operated push buttons 44 for selecting pager features and scrolling text messages presented on pager display 46.

Figure 3:
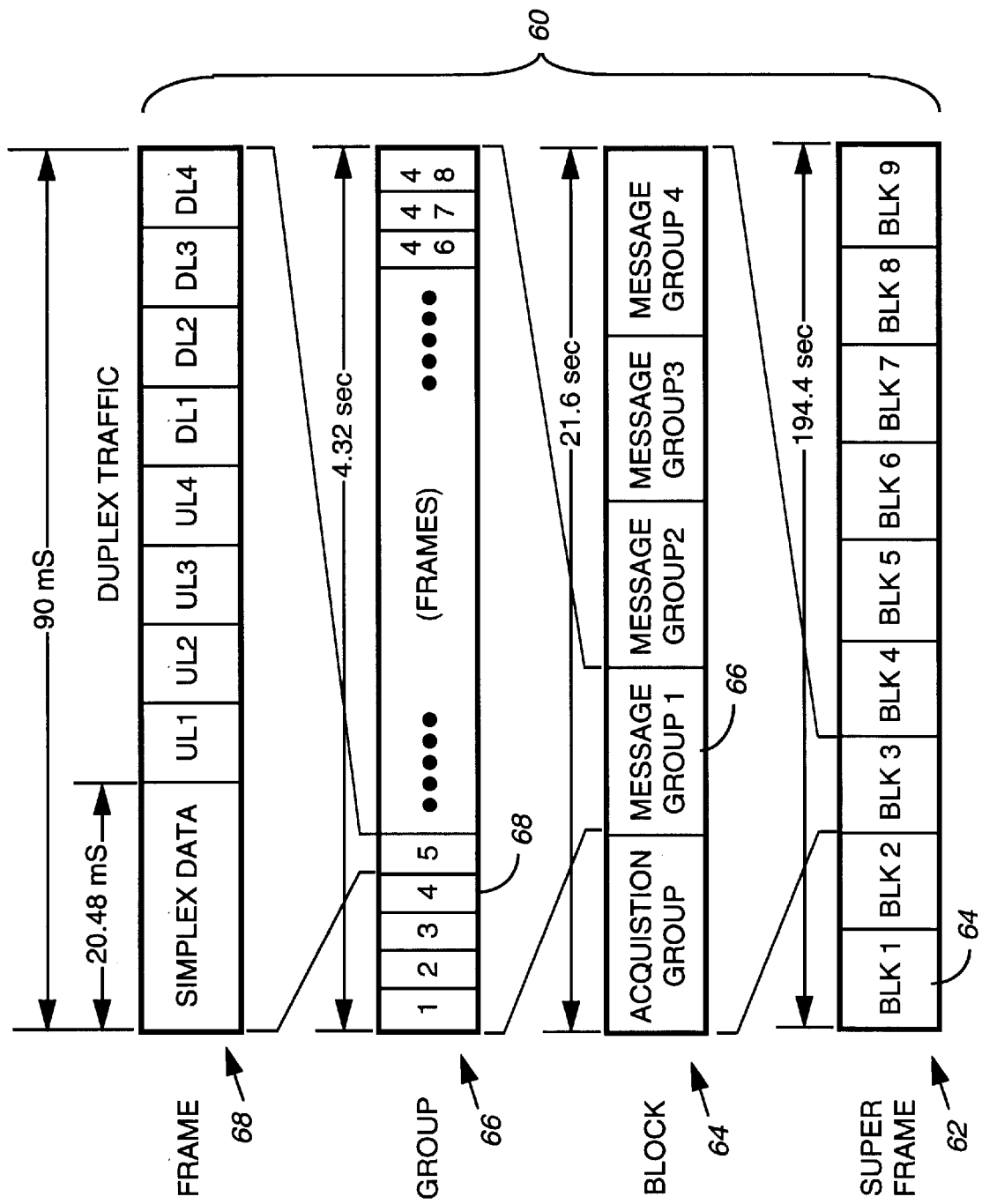
FIG. 3 is a timing diagram showing a paging system timing hierarchy for the system of FIG. 1.

FIG. 3 is an example of a system timing diagram 60 for the system 10 in FIG. 1. In the diagram 60, a system signaling protocol operates on a repeating cycle or "superframe" 62 of 194.4 seconds (3.24 minutes) duration. Each superframe 62 is partitioned into nine blocks 64, and each block is divided into four regional groups 66 preceded by an acquisition group 67. Each message group 66 contains 48 time frames 68. Each time frame 68 lasts 90 milliseconds, and 20.48 msec of each time frame is allocated for simplex data, e.g., base station message signals addressed to system pager units. The balance of each frame 68 is allocated for duplex traffic, e.g., up-link (UL) and down-link (DL) telephone signals.

Figure 4:
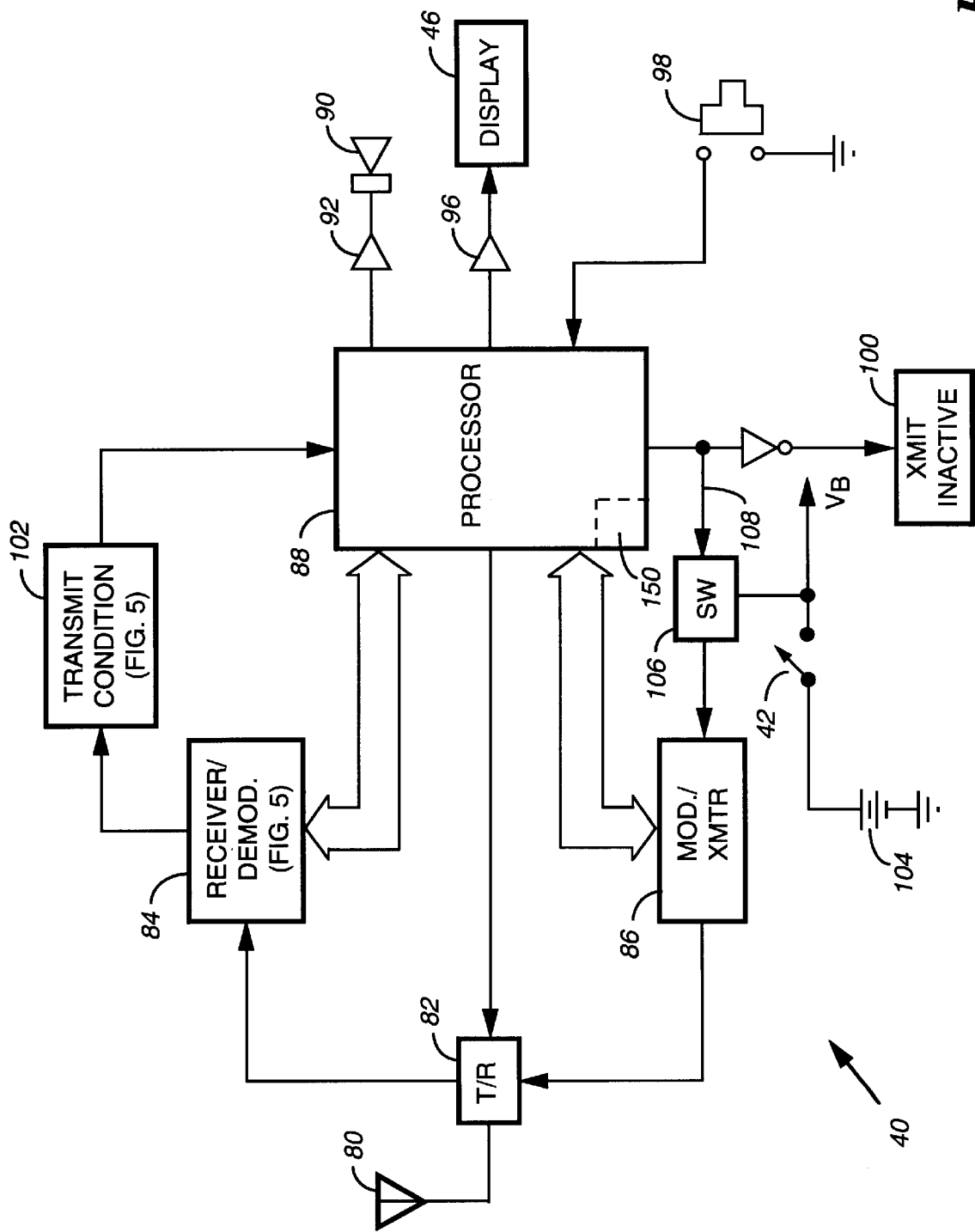
FIG. 4 is a block diagram of a pager according to the invention.

FIG. 4 is a schematic diagram of a pager in which the present invention is embodied, for example, the pager 40 in FIG. 2. An antenna element 80 is coupled to an antenna port of an electronically controlled transmit/receive (T/R) switch 82. A receive port of the switch 82 is coupled to an input of a receiver/demodulator 84, and a transmit port of the switch 82 is coupled to an output of a modulator/transmitter 86. The pager 40 also has a processor/controller 88 which may be in the form of, for example, a digital signal processor (DSP) or a combination of a conventional microprocessor and an application specific integrated circuit (ASIC). Processor 88 is also associated with one or more read-only-memories (ROMs) for storing operating programs and information essential for pager control operations, one or more random access memories (RAMs) enabling the processor 88 to acquire and to process data bearing on the pager operations, and such interface circuitry as needed to couple the processor 88 with input and output (I/O) signal or command lines.

The receiver 84 is under the control of processor 88, and employs a crystal or a frequency synthesizer for purposes of tuning as is known in the art. Likewise, the modulator/transmitter 86 is coupled to the processor 88, and a carrier signal on which information is encoded by the transmitter 86 is derived from a frequency synthesizer in a known manner.

Operating frequencies and modulation protocols used in the pager receiver 84 and in the transmitter 86, correspond to frequencies and protocols adopted by the system 10. Thus, the pager 40 is capable of establishing a direct two-way (half-duplex) communication link with a satellite or other base station during allocated slots of the time frame 68 in FIG. 3.

Each pager 40 also includes a sound ("beep") transducer 90 coupled to an output of the processor 88 through a driver 92, and the display 46 seen in FIG. 2. Display 46 is coupled to an output of the processor 88 through a suitable display driver 96. A "transmitter inactive" indicator 100 is coupled to a corresponding output of the processor 88. A push-button switch 98 may be coupled to a corresponding input of the processor 88, to allow a user of the pager 40 to transmit manually an up-link signal to a base station for a certain purpose, e.g., to acknowledge reception of a particular message. See, e.g., U.S. Pat. No. 4,940,963 (July 1990) all relevant portions of which are incorporated herein by reference. An acknowledgment, location or other kind of up-link signal may also be transmitted from the pager 40 transparently, i.e., without the user's action or knowledge by operation of the processor 88 and its programming.

Battery 104 provides operating voltage ($V_b$) to the pager receiver 84, processor 88 and other components of the pager 40 upon powering the pager power on. Power for the pager transmitter 86 is supplied from the battery 104 through, for example, an analog switch 106. The state of the switch 106 is controlled via a transmit control line 108 from the processor 88.

Figure 5:
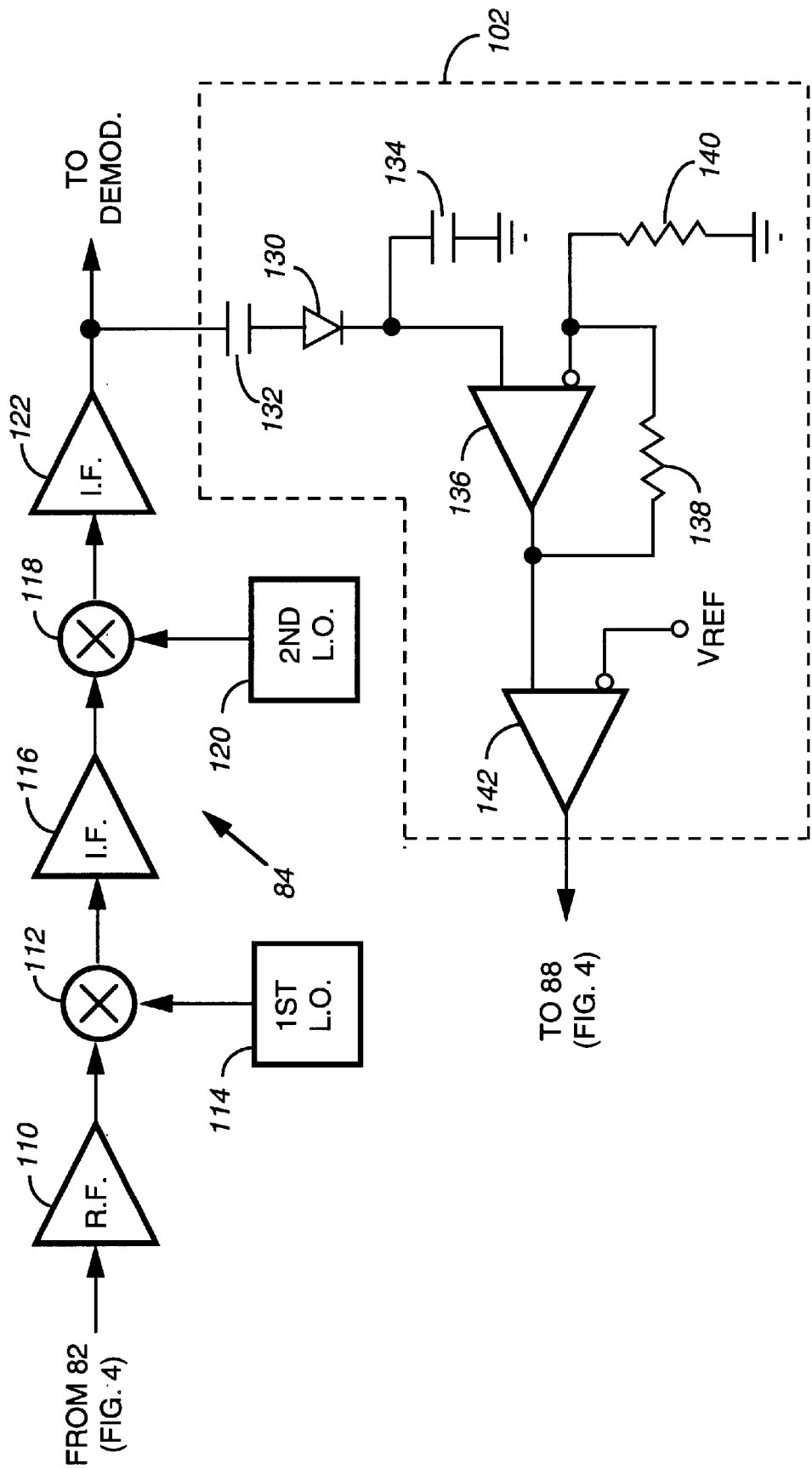
FIG. 5 is a block diagram of a transmit condition stage in the pager in FIG. 4.

The pager 40 also includes a transmit condition stage 102 coupled between the pager receiver 84 and the processor 88. FIG. 5 shows one embodiment of the stage 102 and its connection with part of the receiver 84. The receiver 84 has a RF amplifier stage 110 an input of which is coupled to the receive port on the T/R switch 82 (FIG. 4), and an output of the stage 110 is applied to an input of a mixer stage 112. A first local oscillator (LO) has an output which is applied to a second input of the mixer stage 112. An output of the mixer 112 is applied to an input of an intermediate frequency (IF) amplifier stage 116, and an output of the stage 116 is applied to an input of a second mixer 118. A second LO 120 has an output which is applied to a second input of the mixer 118. An output of the second mixer 118 is applied to an input of an IF amplifier stage 122. An output of the IF stage 122 is applied to a signal demodulator (not shown) which may include additional mixer and IF stages, and such decoder circuitry as is necessary to decode down-link signals received by the pager 40 of FIG. 4. For example, both down-link and up-link signals may be encoded digitally, using quaternary phase shift keying (QPSK) at a data rate of, for example, 2400 baud.

The transmit condition stage 102 includes a diode or signal detecting element 130 one terminal of which is coupled through a capacitance element 132 to an output of the IF stage 122. Persons skilled in the art will understand, however, that other receiver configurations equivalent to those in FIG. 5 may permit the detecting element 130 to be coupled to other nodes of the receiver. The connection arrangement in FIG. 5 is therefore only one of a number of equivalent arrangements. For example, if received signal detection is performed by a digital signal processor (DSP), the transmit condition stage 102 may be realized by software using, e.g., FFT algorithms.

A second terminal of the diode element 130 is connected to a DC filter or capacitance element 134, and to a non-inverting input of a DC amplifier 136. Amplifier 136 has a gain that is fixed by precision resistance elements 138, 140. Specifically, resistance element 138 is connected between an output terminal of the DC amplifier 136 and an inverting input terminal of the amplifier, and the resistance element 140 is connected between the inverting input terminal of amplifier 136, and ground. The gain of the amplifier 136 is determined by the ratio of the resistance elements 138, 140, as is known in the art. The output from the amplifier 136 is coupled to a non-inverting input terminal of another amplifier 142. An inverting terminal of the amplifier 142 is connected to a voltage reference that is preset to a determined level. An output from the amplifier 142 is coupled to an input of the processor 88 as shown in FIG. 4.

A message queue 150 is associated with the processor 88 in FIG. 4. The queue 150 is configured to store pager-related information including, for example, location information that can be periodically updated via an integrated GPS receiver circuit (not shown) in the pager 40. When the transmitter 86 is next enabled, stored information is downloaded either selectively or in a set order (e.g., FIFO) to transmitter 86 for encoding and transmission from the antenna element 80 to a base station (terrestrial or satellite) within the pager's transmitting range.

Operation of the pager 40 of FIGS. 4 and 5 is now explained with reference to FIG. 6. After installing the battery 104, the pager 40 is turned on by actuating the buttons 42, 44. Battery power is supplied to the processor 88 which undergoes an initialization routine 200, as is known in the art. Power is also applied to the receiver 84, the transmit condition stage 102, and other components of the pager 40 except the transmitter 86, in step 202.

A system base station signal received via the pager antenna element 80 and amplified through the receiver 84, is coupled to the transmit condition stage 102, rectified and filtered to provide a DC voltage corresponding to the relative strength of the base station signal. This DC voltage is amplified at a predetermined gain by the DC amplifier 136. A voltage output from amplifier 136 is compared with a preset voltage reference level ($V_{REF}$) via amplifier 142. Thus, assuming the polarities shown in FIG. 5 for purposes of illustration and without limitation, whenever the output from amplifier 136 exceeds the preset level, the output of the amplifier 142 will saturate or go "low". If a base station (down-link) signal received by the pager 40 is not of sufficient strength to cause the amplifier 142 to saturate, the output of amplifier 142 remains "high". The processor 88 monitors the output of the transmit condition stage 102 over a preset time window or interval, for example, the length of one message group (4.32 seconds) in FIG. 3.

The relative signal strength of a base station DL signal received by the pager 40 is a function of the effective base transmitter power (a known quantity), and the attenuation introduced by the length and quality of the propagation path between the base station and the pager 40. The RF power output of the pager transmitter 86 and the strength of a signal radiated from its antenna element 80, are also known quantities. Thus, the strength of the pager's UL signal when received at the same base station over the same propagation path, can be determined based on the strength of the base station signal as received by the pager 40. Thus, a threshold value can be determined such that if a DL signal received by the pager 40 is at or above the threshold value, there will be a substantial likelihood that a UL signal from the pager will arrive at a base station with enough field strength for the base station receiver to respond to and discriminate the pager's signal accurately.

Accordingly, the gain of the DC amplifier 136 and the reference voltage ($V_{REF}$) applied to amplifier 142, are preferably set so that the output of the transmit condition stage 102 will change state whenever the strength of a DL signal received by the pager 40 is at least at such a level as to ensure that UL signals from the pager will reach the originating base station with enough field strength for accurate reception and decoding at the base station.

Figure 6:
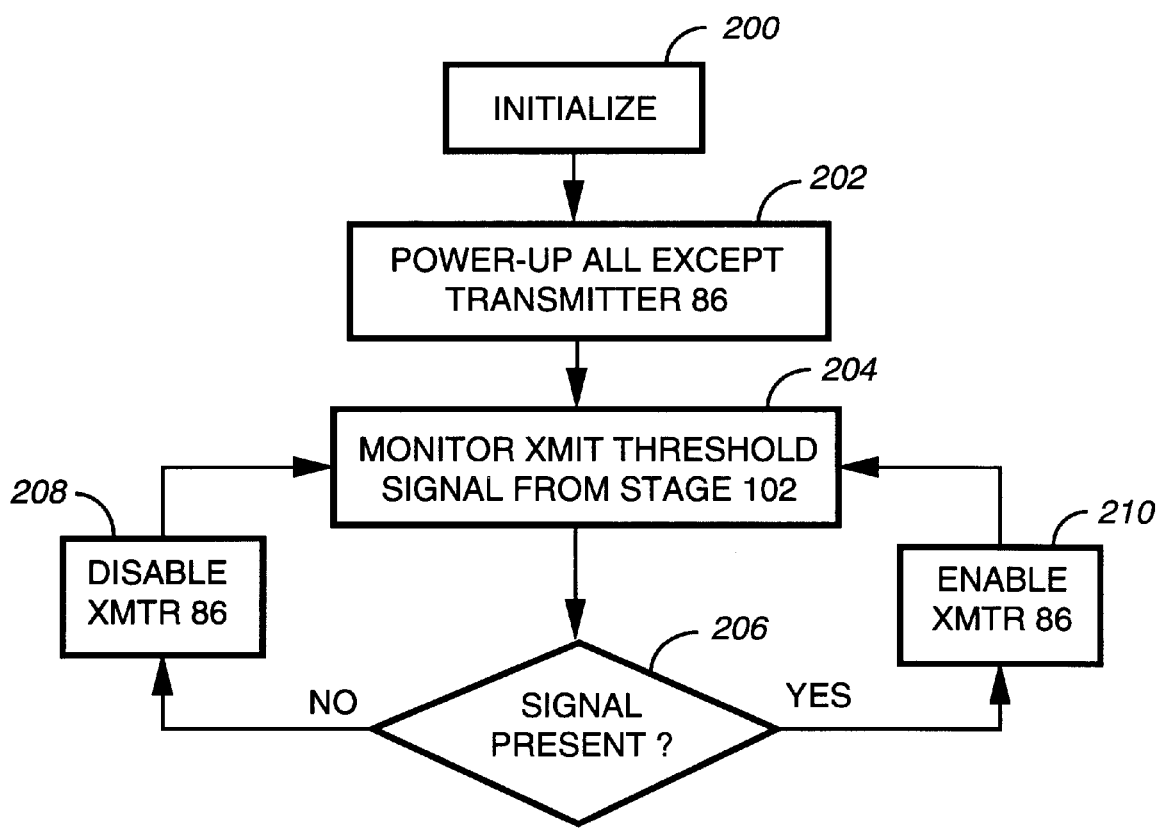
FIG. 6 is a flow chart illustrating operation steps performed in the pager.

In step 204 in FIG. 6, processor 88 processes the output of the transmit condition stage 102. In step 206, the processor determines if the output of stage 102 is low during a determresult is "NO", processor 88 sets a transmit control signal on line 108 to an off state, the indicator 100 is activated, and the processor 88 returns to step 204. See step 208. If, during the determined interval the processor 88 determines that the output of the transmit condition stage 102 is high, the processor sets the transmit control signal to an on state and the indicator 100 is extinguished. See step 210. The analog switch 106 is closed to allow power from the battery 104 to energize the transmitter 86 in the pager 40, and any messages or information stored in queue 150 are placed in condition for downloading to the transmitter 86. The transmitter then continues to operate in response to other signals and commands from the processor 88 while the processor returns to step 204.

When the transmitter 86 of the pager 40 becomes operative, location registration information and requests for stored messages addressed to the pager, can be initiated and transmitted by the pager automatically. The present invention can be applied in any messaging system using a protocol that requires periodic turning ON or "awakening" of a pager receiver to monitor down-link signals. Received signal strength is determined during each "wake" cycle, and the pager transmitter is powered on only when the quality of the propagation path to a base station is deemed favorable for the pager transmitter. Further, rather than setting a transmit threshold based on received DL signal strength over a certain interval, the threshold can be based on a minimum amount of data bit errors detected on DL signals received by the pager over a certain interval.

In summary, the pager 40 provides a reliable messaging transceiver, using a relatively low-power transmitter 86 that operates only when a favorable RF propagation environment has been determined, i.e., when there is a relatively high probability of establishing a return up-link from the pager 40 to a system base station. The pager periodically measures received down-link signal strength or quality and makes a determination of the propagation environment. If the received signal qualities indicate an unfavorable propagation environment, then power-up of the pager transmitter is inhibited and battery power is not wasted.

Referring to the system timing diagram of FIG. 3, a typical system operating environment for the pager 40 having two-way messaging capability, may be as follows. The simplex data, i.e., message data addressed from a base station to system pager units, may be transmitted at about 15 dB higher RF power than the duplex traffic channels (UL/DL). When turned on, the pager units preferably monitor the simplex channels constantly. In a satellite-based system such as the system 10 in FIG. 1, system pagers are preferably capably of determining their approximate geographic location based on simplex data received from a number of orbiting satellites. When a pager determines that it has been moved outside of a last registered location or geographic area previously identified for the pager, the pager preferably informs the system 10 of its new geographic or regional location, as follows.

The pager monitors relative signal strength on the simplex channel, and, when received signals exceed, e.g., 30 dB signal-to-noise level, the pager initiates an up-link (UL) signal and waits for a down-link (DL) acknowledgment from a system base station. If no DL signal is received, the received signal strength threshold is increased, e.g., to 32 dB S/N and the pager transmits a UL signal above such threshold. Finally, if after a determined time interval, no acknowledging DL signal is received, the pager may be programmed to prompt the user otherwise to inform the system 10 that he/she has moved out of his/her registration area. Such a "re-registration" UL signal could be transmitted from the pager after the user locates himself/herself in a relatively open area to achieve a good "lock" on a satellite.

Although the present embodiment is illustrated in a satellite messaging system environment, it may be applied in any wireless messaging or paging system, especially systems having shared transmit and receive sites. The pager transmitter power may be set relatively low thus conserving battery power even when the transmitter is enabled. The receive link margin (system to pager) can be much greater than the transmit link margin (pager to system). The present pager configuration maximizes in-building penetration while minimizing the size and the current drain of the pager. The present configuration allows for a smaller pager transmitter with less power consumption, because "ack-back", location or other signals to be radiated from the pager are delayed until the pager is relocated to a more favorable environment, or, in the case of a satellite-based system, the satellites have moved to a more favorable position.

While the foregoing description represents a preferred embodiment of the invention, it will be obvious to those skilled in the art that various changes and modifications may be made. Accordingly, the scope of the invention is delimited only in accordance with the following claims.

What we claim is:

1. A messaging device, comprising:

a receiver constructed and arranged to receive down-link signals from a base station;

a transmitter constructed and arranged to transmit up-link signals for reception by a base station;

a processor for controlling operations to be performed by the device, wherein the receiver and the transmitter are each coupled to the processor; and a transmit condition stage coupled to the receiver and to the processor, said stage being constructed and arranged to measure a quality of at least one down-link signal received by the receiver, and to output a transmit threshold signal when the measured signal quality corresponds to a substantial likelihood of accurate detection at a base station of an up-link signal to be transmitted from the device; and wherein said processor is configured to cause the transmitter to be powered on only if the transmit threshold signal is present over a given interval prior to a transmitter operation.

2. A messaging device according to claim 1, wherein the processor is configured to respond to said transmit threshold signal over an interval corresponding to a communication system time frame during which signals are addressed from system base stations to selected messaging devices.

3. A messaging device according to claim 1, wherein said processor is configured to cause said transmitter to transmit a location up-link signal from the device.

4. A messaging device according to claim 1, including a queue associated with the processor for storing information to be encoded on up-link signals from the device when the transmitter is subsequently powered on, and said processor is configured to download stored information from the queue for encoding on said up-link signals when the transmitter is powered on.

5. A wireless communication system including at least one messaging device according to claim 1, and at least one system base station aboard an Earth-orbiting satillite.

6. A wireless communication system including at least one messaging devive according to claim 1, and at least one terrestrial system base station.

7. A method of causing a transmitter of a messaging device to be powered on, comprising;

receiving with a device receiver down-link signals from a base station;

providing a device transmitter constructed to transmit up-link signals for reception by a base station;

measuring a quality of at least one down-link signal received by the receiver, and producing a transmit threshold signal when the measured signal quality corresponds to a substantial likelihood of accurate detection at a base station of an up-link signal to be transmitted from the device; and causing the transmitter to be powered on only if the transmit threshold signal is present over a given interval prior to a transmitter operation.

8. The method of claim 7, including responding to said transmit threshold signal over an interval corresponding to a communication system time frame during which down-link signals are addressed from system base stations to selected messaging devices.

9. The method of claim 7, including causing said transmitter to transmit an up-link signal corresponding to a location of the device.

10. The method of claim 7, including queuing information to be encoded on up-link signals from the device when the transmitter is subsequently powered on, and downloading stored information from the queue for encoding on said up-link signals when the transmitter is powered on.

11. The method of claim 7, including operating at least one system base station aboard an Earth-orbiting satillite.

12. The method of claim 7, including operating at least one terrestrial system base station.

* * * * *